April 6, 1926.
W. L. DEMING
FLOAT STRAINER
Filed Oct. 8, 1923
1,579,917
2 Sheets-Sheet 1
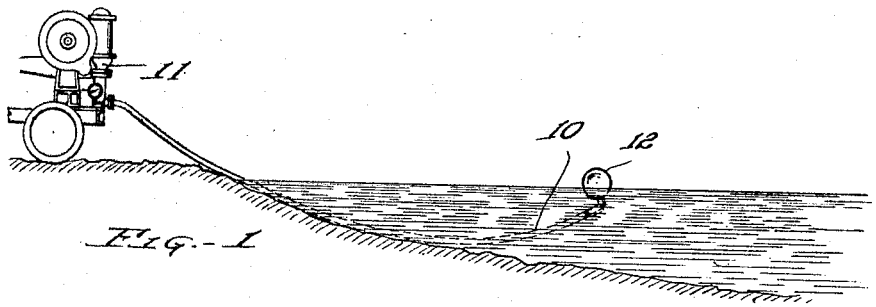
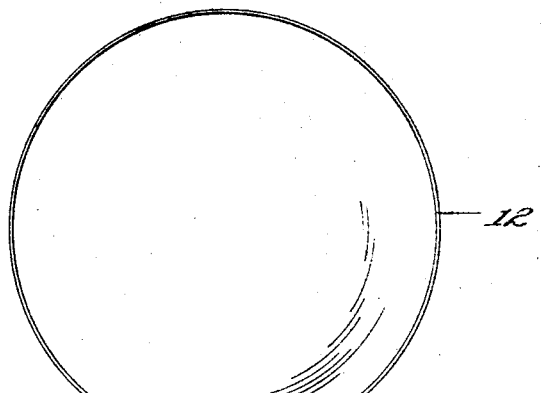
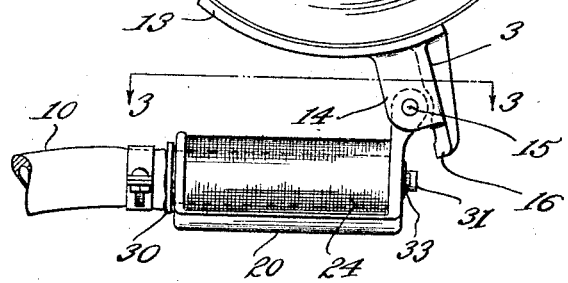
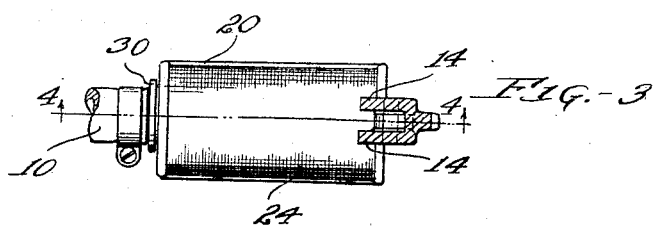
INVENTOR
William L. Deming,
By Bates & Macklin,
ATTORNEYS April 6, 1926.
W. L. DEMING
FLOAT STRAINER
Filed Oct. 8, 1923
1,579,917
2 Sheets-Sheet 2
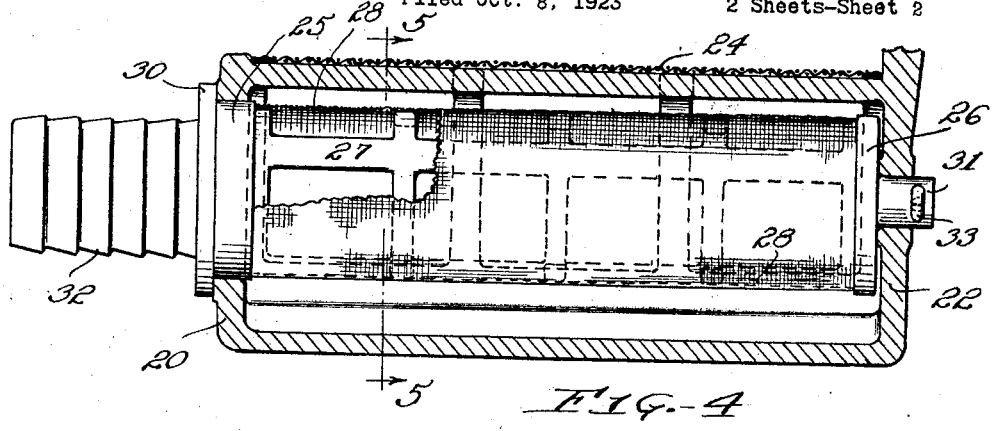
FIG.-4
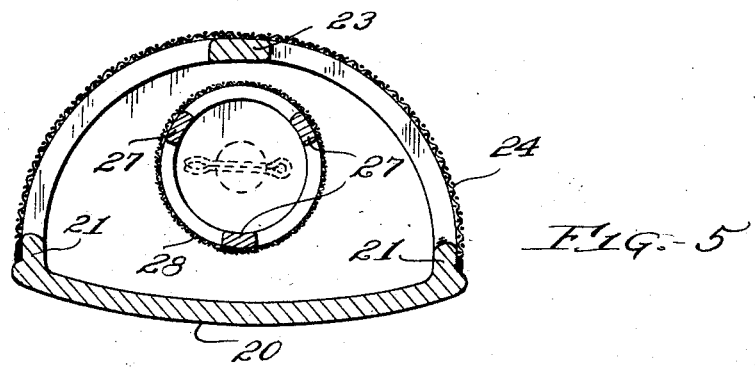
FIG.-5
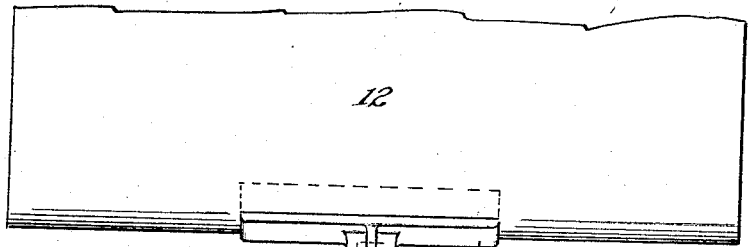
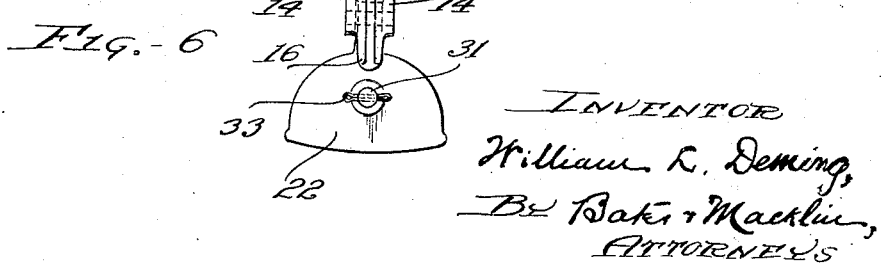
FIG.-6
INVENTOR
William L. Deming,
By Baker & Macklin,
ATTORNEYS Patented Apr. 6, 1926.

1,579,917

UNITED STATES PATENT OFFICE.

WILLIAM L. DEMING, OF SALEM, OHIO, ASSIGNOR TO THE DEMING COMPANY, OF SALEM, OHIO.

FLOAT STRAINER.

Application filed October 8, 1923. Serial No. 667,146.

*To all whom it may concern:*

Be it known that I, WILLIAM L. DEMING, a citizen of the United States, residing at Salem, in the county of Columbiana and State of Ohio, have invented a certain new and useful Improvement in a Float Strainer, of which the following is a full, clear, and exact description, reference being had to the accompanying drawings.

This invention relates to float strainers which are adapted to be connected to the inlet conduit of a pump and to be placed within a body of water such as a stream or pond.

One of the difficulties heretofore encountered in the operation of a strainer which draws water from streams or ponds is the difficulty of preventing the entrance of sand or other matter into the conduit, particularly when the suction strainer rests upon the bottom of the stream. To overcome this difficulty float suction strainers have been devised wherein the inlet opening is disposed near the surface of the water. An objection arising from the use of float suction strainers is that air is frequently sucked into the pump which thereby often causes loss of efficiency.

One of the objects of my invention, therefore, is the provision of a float suction strainer which is so constructed that it may be placed in shallow ponds or streams, and will neither draw sand into the pump, nor permit the entrance of air with the water.

Another object of my invention is the provision of a strainer which may be readily dismantled for cleansing purposes, and which when so dismantled may be readily packed in a compact space.

Still another object of my invention is to so arrange the various parts of the strainer, that it may always be maintained at the proper position for efficient operation, independently of the depth of the water.

The means for carrying out my invention will hereinafter be fully set forth in the following description which pertains to the accompanying drawing. The essential characteristics of my invention will be summarized in the claims.

In the drawing, Fig. 1 is a diagrammatic view showing a portion of a pump having a suction hose leading to a float suction strainer made in accordance with my invention; Fig. 2 is a side elevation on an enlarged scale of the strainer, with the float attached thereto; Fig. 3 is a section taken on the line 3—3 in Fig. 2; Fig. 4 is a longitudinal vertical section through the strainer showing a portion thereof in elevation; Fig. 5 is a section on the line 5—5 in Fig. 4; and Fig. 6 is an end view of the suction strainer and a portion of the hose support.

My invention is illustrated as attached to a hose, which as shown in Fig. 1 leads to a pump indicated at 11. The invention embodies a strainer which is arranged to be held above the bottom of a pond or stream by means of a float and to be so positioned thereon that relative movement between the float and strainer may occur, for permitting the strainer to adjust itself with relation to the float in accordance with the depth of the stream.

The float indicated preferably comprises a cylindrical member having a metal attachment 13 rigidly connected to the curved portion thereof. This attachment as shown, has a bracket integral therewith and preferably disposed adjacent one end thereof. In the preferred form the bracket comprises a pair of spaced arms 14 which are arranged to support the suction strainer. The bracket moreover, preferably is equipped with a lug 16 which forms a shoulder to limit movement of the strainer with relation to the float above the pivoted connection 15, and thus supports the strainer, in approximately horizontal position, as shown in Fig. 1.

The strainer proper preferably comprises an outer member and an inner member. The outer member is shown as having a closed nearly flat bottom 20 which extends between end pieces. The sides of the base or bottom member extend upwardly, as at 21, and are adapted to receive a screen 24. The screen may extend over the end members and may be braced intermediately by a longitudinally extending brace 23. The outer strainer may then rest near or upon the bottom of a stream or pond without permitting the passage of but little if any mud or sand into the interior thereof.

The inner strainer is shown as a cylindrical frame having end pieces 25 and 26 which are respectively supported in the end pieces 21 and 22 on the outer strainer. A plurality of braces 27 are shown as disposed intermediate the end pieces 25 and 26 while a screen 28 is indicated as extending entirely around the braces 27 to form the cylindrical strainer.

The end piece 25 may have a flange 30 which is adapted to engage the end piece 21 to limit inward movement of the inner strainer, while the end piece 26 may have an extension 31 which is arranged to project through the end piece 22 to provide a bearing for the inner strainer.

A tubular extension 32 connected to one end of the strainer permits the attachment of a hose, while a cotter pin 33 carried by the extension 31 may lock the inner strainer in operative position with relation to the outer strainer.

To limit movement of the strainer with relation to the supporting bracket and therefore to the float, I have shown the lug 16 as projecting into the path of angular movement of the strainer about the pivot 15. This lug is adapted to engage the end piece 22 thereby preventing the strainer from being tipped upwardly and permitting air to be drawn into the hose.

The mesh of the screen 24 is preferably larger than that of screen 28, wherefore sediment which enters the outer housing may be trapped within the closed bottom thereby permitting longer use of the strainer before cleaning is necessary. The arrangement of the inner and outer strainer permits the inner one to be readily disconnected, without necessitating disconnection of the hose from the strainer.

A further advantage of a strainer made in accordance with my invention is that the inner strainer may be attached to the hose, while the outer member and float may be connected together thus enabling the suction strainer to be readily assembled for use without requiring a hose to be attached and disconnected with each change in location, or conditions.

I claim:

1. A suction strainer comprising an elongated hollow body having its bottom wall closed, and a longitudinal bar at the top and a curved screen extending from one edge of the bottom across the bar to the other edge of the bottom, a hose connection at one end of the body, and a float connected to the other end of the body.

2. In a device of the class described, the combination with a strainer having a substantially flat closed bottom and ends rising therefrom, vertically extending flanges disposed at opposite sides of the bottom, a covering of foraminous material having the ends thereof rigidly attached to said flanges, a hose connection at one of said ends and a float at the other of said ends.

3. In a device of the class described, the combination with a float, of a depending bracket rigidly attached thereto, a strainer pivotally connected to said bracket, a conduit attached to the strainer, and means associated with the bracket for engaging the strainer to limit angular movement thereof with relation to the float.

4. In a device of the class described, the combination with an outer strainer, comprising a hollow member having a closed bottom and having a curved wall of foraminous material rigidly connected to the opposed sides of said bottom, an inner strainer comprising a cylindrical member having a flange at one end thereof, said flange being adapted to engage one end of the outer strainer, and means associated with the inner strainer and disposed adjacent the other end of the outer strainer for removably securing said strainers together.

5. In a device of the class described, the combination with an outer strainer having a substantially flat closed bottom and having vertically extending flanges disposed at opposite sides of the bottom, a covering of foraminous material having the ends thereof rigidly attached to said flanges, said outer strainer having upstanding ends, an inner strainer having a flange engaging one of the ends on the outer strainer, and means associated with the inner strainer and projecting through the opposite end of the outer strainer for removably connecting said strainers together.

6. In a device of the class described, the combination with a float having a bracket rigidly attached thereto, of a plurality of strainers, one disposed within the other, a frame for the outer strainer pivoted at one end to said bracket, and means for connecting a hose to the other for the inner strainer.

7. In a device of the class described, the combination with a float, of a depending bracket rigidly attached thereto, an outer strainer pivotally connected to said bracket, an inner strainer carried by the first mentioned strainer, a conduit attached to the inner strainer, and means associated with the bracket for engaging the outer strainer to limit the movement thereof with relation to the float.

8. In a device of the class described, the combination with a float, of an outer strainer pivotally connected thereto, an inner strainer removably attached to the outer strainer, means for enabling a hose to be attached to the inner strainer, and means for limiting angular movement of the outer strainer with relation to said float.

9. In a device of the class described, the combination of an outer strainer having a closed bottom and a foraminous top, and end walls rising from the bottom, a float connected to the outer strainer at one end, the end wall at the opposite end having a cylindrical opening, an inner strainer in the form of a cylindrical body adapted to be inserted through said opening and provided with means for anchoring it to the opposite end wall of the outer strainer.

In testimony whereof, I hereunto affix my signature.

WILLIAM L. DEMING.